United States Patent Office 3,402,610
Patented Sept. 24, 1968

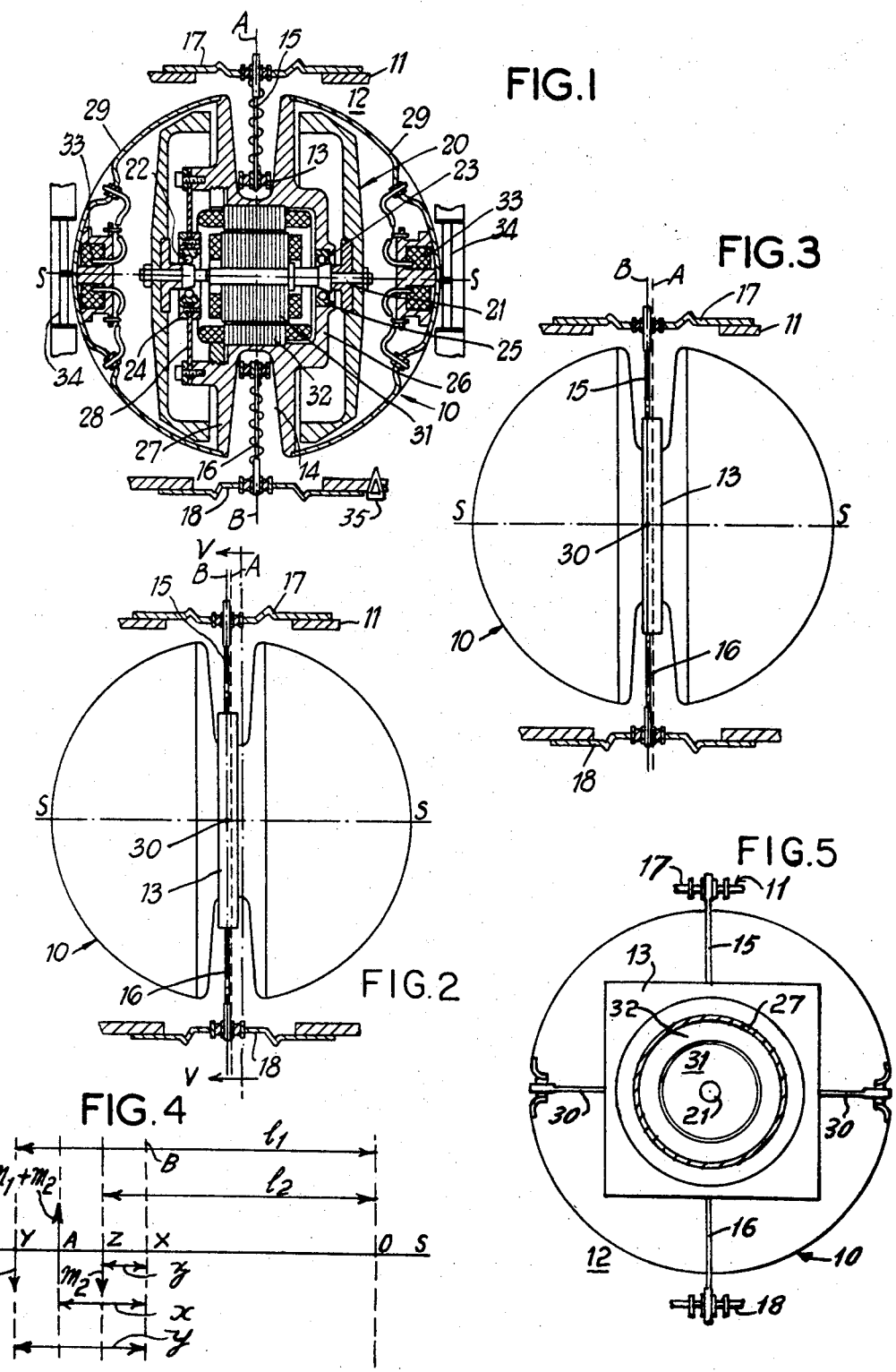

3,402,610
GYROSCOPES
Douglas Barnett, Watford, England, assignor of one-half to S. G. Brown Limited, Watford, England, a British company
Filed Mar. 23, 1966, Ser. No. 536,694
Claims priority, application Great Britain, Mar. 24, 1965, 12,474/65; Apr. 22, 1965, 16,976/65
10 Claims. (Cl. 74—5)

ABSTRACT OF THE DISCLOSURE

In a flotation type gyroscope wherein the rotor is located in a sealed casing in liquid suspension in a tank, the movement of the centre of gravity of the casing caused by a variation in temperature is compensated by spacing the centre of gravity and also the centre of buoyancy of the casing at such horizontal distances from an axis about which the casing can tilt that a change in the gravity torque about the axis due to the movement of the centre of gravity caused by the temperature variation is equaled or approximately equaled by a change in the buoyancy torque due to the change in the density of the liquid caused by the temperature variation.

---

The invention relates to gyroscopes.

In known gyroscope constructions, the gyro rotor or wheel is mounted within a generally spherical casing, usually referred to as the gyro ball. The ball is hermetically sealed and suspended at neutral buoyancy in a flotation fluid with a tank. The ball is supported centrally within the tank by means permitting at least a degree of rotation of the ball but preventing translation, for example by fine torsion wires which extend between the tank and a gimbal ring in the tank and between the ring and the ball.

In such constructions, the centre of gravity and the centre of buoyancy are arranged to coincide in the plane of the torsion wires or other support means and there is consequently no torque on the gyro wheel due to these mounting arrangements.

However, the position of the centre of gravity tends to vary with temperature. For example, the shaft of the gyro rotor is normally mounted on a pair of angular contact ball race bearings, the housing of which are positioned to preload each bearing. The two housings can be rigidly fixed with respect to the gyro ball, but this requires great precision in manufacture and assembly, and small dimensional changes due for example to temperature variations have very large effects on the preload which lead to reduced life. One bearing housing is therefore normally carried by a suitably designed spring. The assembly then requires a lower degree of precision and dimensional changes will not affect the preload. However, the assembly is not symmetrical, and it incorporates materials of different coefficients of thermal expansion so that a temperature change will cause an appreciable movement of the centre of gravity of the assembly out of the torsion wire plane, in which the centre of buoyancy remains, and there is a consequent imbalance torque on the gyro.

Moreover, although the flotation fluid is normally stabilized to the temperature at which the gyro ball has neutral buoyancy, there may be periods before the gyroscope has reached its working temperature when it is required to operate to ensure rapid settling without spurious drift rate due to temperature effects. In any event, the fluid temperature may not stabilize exactly at the desired value, for example, because of limitations in the accuracy of the thermostatic control mechanism. Moreover, for some applications it would be advantageous to dispense entirely with the need for thermal stabilization of the flotation fluid in the interests of simplicity and cheapness.

The main object of the present invention is therefore to provide a gyroscope having a gyro wheel contained in a casing immersed in a fluid, in which imbalance torques due to temperature variations are eliminated or at least substantially reduced.

The invention accordingly provides a gyroscope having a rotor mounted for rotation within a sealed casing suspended in a liquid in a tank, in which the effect on the suspension means of any movement of the centre of gravity of the casing due to a temperature variation is opposed and at least substantially equalized by a change in the buoyancy of the casing due to the temperature variation.

The invention also provides a gyroscope having a rotor mounted for rotation within a sealed casing supported in a liquid in a tank, in which, at a temperature corresponding to support of the casing at neutral buoyancy, the centre of gravity and the centre of buoyancy of the casing coincide at a point spaced from the horizontal support axis of the casing by a distance such that a change in the gravity torque about the axis due to movement of the centre of gravity resulting from a temperature variation is balanced or approximately balanced by the change in the buoyancy torque about the axis resulting from the effect on the liquid of the temperature variation.

For better understanding of the invention reference can be made to the following illustrative description and to the accompanying drawing referred to therein. In the drawing:

FIGURE 1 is a sectional side view of a gyro rotor casing or ball mounted within a housing or tank by means of a gimbal ring;

FIGURE 2 is a diagrammatic side side view corresponding to FIGURE 1 showing the mounting arrangement of that figure in an exaggerated way;

FIGURE 3 is a view corresponding to FIGURE 2 but showing an alternative mounting arrangement;

FIGURE 4 is a diagrammatic representation of the forces occurring in the arrangement of FIGURE 1; and FIGURE 5 is a diagrammatic sectional view on the line V—V of FIGURE 2.

The gyro rotor casing or ball 10 shown in FIGURE 1 is mounted within a housing or tank 11, the space between the ball and tank walls being filled by a liquid 12. Means 35, which may be any of the well-known class of temperature stabilizing devices, is provided for stabilizing the temperature of the liquid 12 at a normal working temperature. The mounting arrangements comprise a gimbal ring 13 received in a deep channel or groove 14 extending around the ball 10, the groove being symmetrically disposed with respect to the vertical equatorial plane A of the ball. The ring 13 is connected to the ball by horizontal torsion wires 30 and by vertical wires 15, 16 to diaphragms 17, 18 respectively. The diaphragms 17, 18 are supported within the tank 11 so that the liquid 12 can flow around them. The two sets of torsion wires lie in a vertical plane B; as will be later explained, the vertical planes A and B are not coincident, as they appear in FIGURE 1, but are slightly spaced apart by an amount shown, for the sake of clearness, much exaggerated in FIGURES 2 and 3 only.

Within the ball 10 a gyro wheel or rotor assembly 20 is secured on a horizontal shaft 21, the spin axis S—S of which is at right angles to the axes of the torsion wires and will normally be arranged to extend North-South for use of the gyroscope as a gyrocompass. The shaft 21 is carried at either end by angular contact ball race bearings assemblies 22, 23 having housings 24, 25 respectively The housing 25 is rigidly secured to a part 26 of a ring 27 in which the groove 14 is formed. The housing 24 is however secured to a spider 28 which is connected to the frame 27 and which is stressed to apply a preload to the bearing assemblies 22, 23. End bells 29 secured and hermetically sealed to the ring 27 complete the exterior of the ball 10. The rotor assembly 20 is provided in the usual way with laminations 31 for cooperation with stator laminations 32 by which the assembly is driven. Also in the usual way, the ball 10 carries magnets 33 for cooperation with pick-off units 34 mounted on the tank 11.

These mounting arrangements for the bearing assemblies 22, 23 ensure that dimensional changes due for example, to temperature changes have little effect on the preload and therefore do not adversely affect the life of the rotor assembly 20. However as explained above, these arrangemnets also mean that the centre of gravity of the ball 10 will move slightly along the axis S—S of the shaft 21, on a change in temperature.

It will be appreciated that if the centre of buoyancy of the ball 10 and its centre of gravity coincide in the vertical torsion wire plane B, either relative movement of the centre of gravity and the centre of buoyancy or a change in the specific gravity of the liquid 12 will upset the equilibrium and give rise to an imbalance torque about the axis of the horizontal torsion wires, which will introduce an error drift in the gyrocompass operation.

In accordance with the invention, therefore, and as indicated in FIGURE 2, the ball 10 is balanced North against South with its centre of gravity and centre of buoyancy arranged to lie slightly spaced towards the South side from the vertical plane B of the torsion wires, that is, towards the right in the figure. It will be evident that if these two centres coincide, they can be spaced from the plane B without causing an imbalance torque, provided the ball remains at neutral buoyancy in the liquid 12. The gyro wheel mounting arrangement within the ball is such that a temperature increase will cause the centre of gravity to move toward the North or left hand end of the spin axis S—S. Such movement reduces the gravity torque about the horizontal torsion wire axis 30 (FIGURE 2), which torque was previously cancelled by that due to the buoyancy force. The shift of the centre of gravity does not affect the position of the centre of buoyancy in plane A so that if the buoyancy force were unaltered there would now be a net torque about the axis 30 due to the excess of the buoyancy torque over the reduced gravity torque. However, the temperature increase brings about a decrease in the density of the liquid 12 and thus also decreases the buoyancy force, which still acts through the unchanged centre of buoyancy, to compensate for the reduced gravity torque. In a similar way, movement of the centre of gravtiy to the South along the axis S—S, due to a temperature decrease, will be counteracted by an increase in the buoyancy pressure, due to the same temperature change. The balancing of the two effects thus confers temperature stability on the arrangement.

The appropriate displacements of the centres of gravity and buoyancy from the plane of the torsion wires or from the horizontal axis of other support means can be achieved by a suitable construction of the contents of the gyro ball or, wtih the conventional ball construction illustrated, by off-setting the anchorage points of the horizontal wires on the ball 10, by a small distance towards the North end of the spin axis as shown in FIGURE 2. The off-set is much exaggerated in FIGURE 2; in practice, the distance may be, for example, only 0.006 inch.

This way of effecting the displacement however means that the ball 10 is no longer centered in the tank 11 so that there is a risk of inaccuracies arising from swirling of the liquid 12 or from translation errors in the pick-off coils. It is therefore preferred, as shown in FIGURE 3, to offset both the horizontal and the vertical torsion wire anchorages so that the gimbal ring 13 is symmetrically disposed relative to the ball 10 and the ball is centered within the tank 11.

By considering FIGURE 4, an expression for the required common displacement of the centre of gravity and buoyancy from the plane of the torsion wire B can be obtained. In FIGURE 4, O represents the postion of the fixed bearing 23 on the spin axis S—S, A the geometric centre, assumed to be the centre of buoyancy, of the ball 10, and X the point of intersection of the spin axis S—S by the plane B containing the torsion wires. Y represents the position, distant $y$ from X, of the centre of gravity of the fixed part of the ball 10 through which acts its weight $m_1$, and Z represents the position, distant $z$ from X, of the centre of gravity of the gyro rotor assembly 20 through which acts the weight $m_2$ of the assembly.

Then at the temperature at which the ball as neutral buoyancy, the net torque about X is:

$$x(m_1+m_2)-ym_1-zm_2$$

The coefficients of (linear) thermal expansion for the gyro case and rotor materials are respectively $\alpha_1$ and $\alpha_2$, the mean coefficient of cubic thermal expansion for the ball 10 is $\gamma_1$, (assuming that over the limited range of temperature change under discussion the ball behaves as a homogeneous mass) and the coefficient of cubic thermal expansion for the flotation liquid 12 is $\gamma_2$.

Then after a temperature change of $t$, the distances OY or $l_1$ and OZ or $l_2$ change to $l_1(1+\alpha_1 t)$ and $l_2(1+\alpha_2 t)$ respectively and the volume of fluid displaced by the ball becomes $$\frac{(l+\gamma_1 t)(m_1+m_2)}{l+\gamma_2 t}$$

If it be assumed that $x$ and $y$, which are in practice only a few thousandths of an inch, do not appreciably change by comparison with $l_1$ and $l_2$ during the temperature change $t$, then the new net torque about X is:

$$\frac{x(m_1+m_2)(l+\gamma_1 t)}{l+\gamma_2 t}-ym_1-m_2[z+l_2(l+\alpha_2 t)-l_1(l+\alpha_1 t]$$

These two net torques about X are required to be equal and the two expressions derived are therefore equated.

If it be assumed that $x$ and $y$ do not change appreciably compared with $l_1$ and $l_2$ and that $l_1$ and $l_2$ are for practical purposes equal, then:

$$x=\frac{m_2 l_1(\alpha_1-\alpha_2)(l+\gamma_2 t)}{(m_1+m_2)(\gamma_2-\gamma_1)}$$

The expression can be further simplified to $$x=\frac{m_2 l_1(\alpha_1-\alpha_2)}{(m_1+m_2)\gamma_2}$$

because $\gamma_2 t$ is very small compared with $l$ and $\gamma_1$ is very small compared with $\gamma_2$.

It will be evident that the principle of balancing of the invention is of general application to gyroscopes and is not restricted to gyrocompass or directional gyro applications. The invention can be embodied in gyroscopes in any attitude, for example, with the spin axis vertical, in which case imbalance errors due to horizontal accelerations would be reduced. Moreover, the particular internal gyro ball construction described, is not essential to the invention, which can be applied to any floated ball construction in which the position of the centre of gravity is not independent of temperature. It will be further noted that the invention is not confined to the particular means described for suspending the ball within the fluid-filled tank. Instead of the torsion wires described, the connections between the ball and the gimbal ring and between the ring and the tank can comprise pivots or ball races; any suitable means for suspending the ball within the tank so as to prevent translation whilst allowing for at least a small amount of relative rotation between the ball and the tank can be used.

The invention can thus be variously embodied, and the embodiments described can be modified in various ways, all within the scope of the invention as defined in the following claims.

What is claimed is:

1. A gyroscope having a sealed casing, a gyro rotor rotatably mounted within the casing, a tank, means suspending the casing within the tank, said suspension means permitting rotation and preventing translation of the casing relative to the tank, and a fluid filling the space between the casing and the tank, the centre of gravity of the casing and the centre of gravity of buoyancy of the casing being spaced from a suspension axis of the suspension means so that a change in the gravity torque about the axis arising from a movement of the centre of gravity due to a temperature variation is at least approximately compensated by a change in the buoyancy torque about the axis arising from a change in the density of the fluid due to the temperature variation.

2. A gyroscope as claimed in claim 1 in which the rotor is mounted within the casing on a rotatable shaft carried by a pair of preloaded bearings, one of the bearings being rigidly mounted and the other being mounted on spring means.

3. A gyroscope as claimed in claim 1 in which the centre of gravity and the centre of buoyancy are arranged to coincide at the normal working temperature of the gyroscope.

4. A gyroscope as claimed in claim 3 having means for stabilizing the temperature of the fluid at the normal working temperature.

5. A gyroscope as claimed in claim 1 in which the suspension means comprises a gimbal ring between the tank and the casing, a first pair of support means extending between the casing and the ring and permitting pivotation about said suspension axis, and a second pair of support means extending between the ring and the tank and permitting pivotation about a second axis at right angles to the suspension axis, in which the tank, and the ring and the casing have a common plane of symmetry in which the centre of buoyancy of the casing lies, and in which the suspension axis and the second axis lie in a plane spaced from the plane of symmetry.

6. A gyroscope as claimed in claim 5 in which the support means comprise torsion wires.

7. A gyroscope as claimed in claim 1 in which the suspension means comprises a gimbal ring between the tank and the casing, a first pair of support means extending between the casing and the ring and permitting pivotation about said suspension axis, and a second pair of support means extending between the ring and the tank and permitting pivotation about a second axis at right angles to the suspension axis, in which the tank and the ring have a common plane of symmetry in which the first and second axes lie, and in which the centre of buoyancy of the casing lies in a plane of symmetry of the casing and is spaced from the first mentioned plane of symmetry.

8. A gyroscope as claimed in claim 5 in which the rotor is mounted within the casing on a rotatable shaft carried by a pair of preloaded bearings, one of the bearings being rigidly mounted and the other being mounted on spring means.

9. A gyroscope as claimed in claim 5 in which the centre of gravity and the centre of buoyancy are arranged to coincide at the normal working temperature of the gyroscope.

10. A gyroscope as claimed in claim 9 in which means are provided for stabilizing the temperature of the fluid at the normal working temperature.

References Cited

UNITED STATES PATENTS 2,896,455  7/1959  Bishop et al _____ 74—5.5

FRED C. MATTERN, JR., *Primary Examiner.*

F. D. SHOEMAKER, *Assistant Examiner.*